Patented Dec. 7, 1943

2,336,215

UNITED STATES PATENT OFFICE 2,336,215

ISOALKYLIDENE AMINOPHENOL

Frederic R. Bean, Rochester, N. Y., assignor to Eastman Kodak Company, Rochester, N. Y., a corporation of New Jersey No Drawing. Application March 15, 1941, Serial No. 383,603

2 Claims. (Cl. 260—566)

This invention relates to isoalkylidene aminophenols and to a process for the preparation thereof.

In my copending application Serial No. 134,903, filed April 3, 1937, I have shown that N-alkyl aminophenols can be prepared by reducing the reaction product of an aldehyde and an aminophenol, i. e. a N-alkylidene aminophenol, with alkali and aluminium. In accordance with a preferred embodiment of the process described in my copending application, the N-alkylidene aminophenol is formed by treating one mole of aminophenol with one mole of aldehyde, in a solvent for the aminophenol, and then reducing the N-alkylidene aminophenol which is formed. In accordance with one form of my invention disclosed in my copending application, I treat one mole of aminophenol with one mole of 2-ethylbutyraldehyde (an alpha isoaldehyde), in the presence of aqueous sodium hydroxide, to form N-(2-ethylbutylidene)-p-aminophenol (a N-alpha isoalkylidene aminophenol), and then reduce the N-(2-ethylbutylidene)-p-aminophenol to N-(2-ethylbutyl)-p-aminophenol.

The N-alpha isoalkylidene aminophenols, unlike many of the N-alkylidene aminophenols, are sufficiently stable that they can be isolated in substantially pure form and kept for some time without excessive deterioration, in an inert atmosphere and in the absence of water vapor. Moreover, the N-alpha isoalkylidene aminophenols can be reduced readily to give N-alpha isoalkyl aminophenols in a high state of purity and in a good yield.

It is, accordingly, an object of my invention to provide N-alpha isoalkylidene aminophenols. A further object is to provide a process for preparing N-alpha isoalkylidene aminophenols. Other objects will become apparent hereinafter.

In accordance with my invention, I prepare N-alpha isoalkylidene aminophenols by condensing an alpha isoalkyl aldehyde with an aminophenol containing an NH$_2$ group, i. e. with a so-called primary aminophenol.

According to the English system of numbering the carbon atom attached to the CHO group of an aliphatic aldehyde is denoted as the alpha carbon atom. The term "iso," as employed herein, denotes a branched-chain group or radical. Hence, the term "alpha isoalkyl aldehyde," as used herein, denotes an aliphatic aldehyde in which at least two alkyl groups are attached to the carbon atom next to the CHO group. The aldehydes can be represented by the formula:

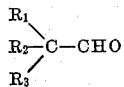

wherein R$_1$ and R$_2$ represent alkyl groups and R$_3$ represents hydrogen or an alkyl group. These aldehydes necessarily contain at least four carbon atoms.

The N-(α-isoalkylidene)-aminophenols, therefore, are the alkylidene aminophenols which can be represented by the following general formula:

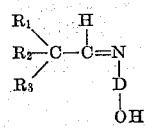

in which D represents an arylene group, R$_1$ and R$_2$ represent alkyl groups and R$_3$ represents hydrogen or an alkyl group. A preferred group of my N-(alpha isoalkylidene)-aminophenols can be represented by the following general formula:

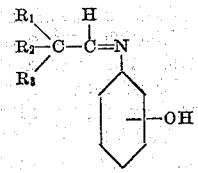

wherein R$_1$ and R$_2$ represent alkyl groups and R$_3$ represents hydrogen or an alkyl group.

I have found that when an α-isoalkyl aldehyde is mixed with a primary aminophenol particularly in an aqueous solvent, the aldehyde and aminophenol condense in equimolecular proportions to give high yields of substantially pure N-(α-isoalkylidene)-aminophenol. The condensation takes place at low temperatures, such as room temperatures, and at temperatures as high as 125° C. without material polymerization of either the aldehyde or the isoalkylidene aminophenol.

The following examples will serve to illustrate my invention:

*Example 1.—N-(2-ethyl butylidene)-p-aminophenol*

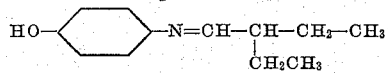

8 g. (2 mol.) of sodium hydroxide were dissolved in 150 cc. of water. The air in the solution was replaced by passing nitrogen through the solution. After all the air was replaced and while nitrogen was bubbling through the solution, 11 g. (1 mol.) of p-aminophenol were dissolved in the solution. 0.1 g. of sodium sulfite and 0.1 g. of sodium bisulfite were also dissolved in the solution. To the resulting solution were then added 10 g. (1 mol.) of 2-ethylbutyraldehyde. The resulting mixture, consisting of two layers, was then vigorously agitated at 60° to 70° C., out of contact with air. After one-half to one hour the layer of 2-ethylbutyraldehyde disappeared. The resulting mixture was then allowed to stand, out of contact with air, for about twelve hours at about 40° C. The mixture was then poured, with stirring, into 300 cc. of cold water containing 16 cc. of glacial acetic acid. The N-(2-ethyl butylidene)-p-aminophenol precipitated as white crystals. These crystals were filtered off by suction. The crystals were washed with cold water. They can be recrystallized from gasoline or from petroleum ether. They melt at about 80° C. with some prior softening. This compound can also be called N-(2-ethyl butyral)-p-aminophenol. The compound is soluble in benzene and can be precipitated from a solution in benzene by diluting the solution with gasoline. The compound can be reduced to N-(2-ethyl butyl)-p-aminophenol, melting at 98° to 99° C., by means of aluminium and sodium hydroxide, as set forth in my copending application Serial No. 134,903, filed April 3, 1937.

*Example 2.—N-(2-ethyl hexylidene)-p-aminophenol*

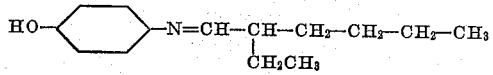

40 g. (2 mol.) of sodium hydroxide were dissolved in 1000 cc. of water. The air in the solution was replaced by passing nitrogen through the solution. After the air was replaced and while the nitrogen was passing through the solution, 55 g. (1 mol.) of p-aminophenol were dissolved in the solution. 0.1 g. of sodium sulfite and 0.1 g. of sodium bisulfite were also dissolved in the solution. To the resulting solution were then added 64 g. (1 mol.) of 2-ethylhexaldehyde. The resulting mixture, consisting of two layers, was vigorously agitated at 60° to 70° C. in the absence of air. After some time the layer of 2-ethylhexaldehyde disappeared. The resulting mixture was then allowed to stand, out of contact with air, for about twelve hours at about 40° C.. The mixture was then poured, with stirring, into 1500 cc. of water containing 80 cc. of glacial acetic acid. The N-(2-ethyl hexylidene)-p-aminophenol separated as an oil which was nearly colorless. The oil was separated from the aqueous liquors and washed with cold water. It can be distilled under very low pressures (e. g. 0.1 to 0.5 mm. of mercury). It is soluble in benzene. This substance can also be called N-(2-ethyl hexanal)-p-aminophenol. It can be reduced to N-(2-ethyl hexyl)-p-aminophenol by means of alkali and aluminium in accordance with the process set forth in my copending application Serial No. 134,903, filed April 3, 1937.

In a similar manner N-(2-methyl butylidene)-p-aminophenol which can also be called N-(2-methyl butyral)-p-aminophenol can be prepared from 2-methyl butyraldehyde (2-methyl butanal), or N-isobutylidene-p-aminophenol from isobutyraldehyde. Instead of p-aminophenol in the above examples, o-aminophenol, m-aminophenol or aminocresols can be used. In the above examples, the sodium hydroxide can be replaced by any alkali. Alkali metal hydroxides are advantageously employed.

N-isoalkylidene aminophenols are useful as antioxidants for gasoline, oils, resins or rubber, but are especially useful as intermediates for the preparation of N-isoalkyl aminophenols.

What I claim as my invention and desire to be secured by Letters Patents of the United States is:

1. A process for preparing a N-($\alpha$-isoalkylidene)-p-aminophenol comprising condensing one molecular proportion of an $\alpha$-isoalkyl aldehyde with one molecular proportion of a primary aminophenol, in the presence of two molecular proportions of an alkali metal hydroxide dissolved in water and bringing the resulting aqueous mixture into contact with an acid in order to precipitate the N-($\alpha$-isoalkylidene)-p-aminophenol.

2. A process for preparing a N-($\alpha$-isoalkylidene)-p-aminophenol comprising condensing one molecular proportion of an $\alpha$-isoalkyl aldehyde with one molecular proportion of p-aminophenol, in the presence of two molecular proportions of an alkali metal hydroxide dissolved in water and bringing the resulting aqueous mixture into contact with an acid in order to precipitate the n-($\alpha$-isoalkylidene)-p-aminophenol.

FREDERIC R. BEAN.